United States Patent
Hsu et al.

(10) Patent No.: US 9,671,907 B2
(45) Date of Patent: Jun. 6, 2017

(54) TOUCH MODULE AND TOUCH PANEL

(71) Applicant: TPK Touch Solutions (Xiamen) Inc., Xiamen (CN)

(72) Inventors: I-Chung Hsu, Taoyuan (TW); Kuo-Shu Hsu, Xinbei (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 14/160,561

(22) Filed: Jan. 22, 2014

(65) Prior Publication Data
US 2014/0210778 A1    Jul. 31, 2014

(30) Foreign Application Priority Data

Jan. 28, 2013   (CN) ................... 2013 1 0033137

(51) Int. Cl.
*G06F 3/044* (2006.01)
(52) U.S. Cl.
CPC .... *G06F 3/044* (2013.01); *G06F 2203/04111* (2013.01)
(58) Field of Classification Search
CPC . G06F 3/041; G06F 3/044; G06F 2203/04103
See application file for complete search history.

(56) References Cited

U.S. PATENT DOCUMENTS

| | | | |
|---|---|---|---|
| 4,464,701 A * | 8/1984 | Roberts et al. ............... | 361/313 |
| 2007/0262962 A1* | 11/2007 | XiaoPing ................. | G06F 1/32 345/173 |
| 2008/0264699 A1* | 10/2008 | Chang ..................... | G06F 3/044 178/18.01 |
| 2011/0050625 A1* | 3/2011 | Kim ........................ | G06F 3/044 345/174 |
| 2011/0134055 A1* | 6/2011 | Jung ....................... | G06F 3/044 345/173 |
| 2012/0026128 A1* | 2/2012 | Chen et al. .................. | 345/174 |
| 2012/0188184 A1* | 7/2012 | Lin et al. ...................... | 345/173 |
| 2013/0154979 A1* | 6/2013 | Li .......................... | G06F 3/041 345/173 |

OTHER PUBLICATIONS

J. Robertson, High dielectric constant oxides, 2004, Eur.Phys. J. Appl. Phys, vol. 28, pp. 265-291.*

* cited by examiner

*Primary Examiner* — Ilana Spar
*Assistant Examiner* — Mihir K Rayan
(74) *Attorney, Agent, or Firm* — Cooper Legal Group, LLC (57) ABSTRACT

A touch module and a touch panel comprising the same are provided. The touch panel comprises a substrate and a touch module disposed on the substrate. The touch module comprises a first conductive element, a second conductive element, and a dielectric element disposed between the first conductive element and the second conductive element, whereby the first conductive element are electrically insulated from the second conductive element. The dielectric element has a thickness equal to or less than 1 micrometer, and thereby it is beneficial to achieve miniaturization of the touch panel.

3 Claims, 7 Drawing Sheets

TOUCH MODULE AND TOUCH PANEL

BACKGROUND OF THE INVENTION

The present invention claims the priority of China Patent Application No. 201310033137.2 filed on Jan. 28, 2013, which is incorporated by reference in the present application in its entirety.

Field of the Invention

The present invention relates to a touch technology, particularly to a touch module and a touch panel comprising the same.

Description of the Prior Arts

With the advance of touch technology, more and more electronic devices, such as mobile phones, global positioning and navigation systems (GPS navigator system), tablet personal computers (tablet PC), personal digital assistants (PDA) and laptop PC, adopt a touch panel to incorporate the touch and display functions. Currently, common touch panels are classified into resistive, capacitive and optical touch panels. Due to its high accuracy, multi-touch, high durability and high resolution, the capacitive touch panel has become the most popular touch technology in the general and high-end consumer electronic devices.

A general capacitive touch panel comprises a substrate, a cover and a capacitive touch module. The substrate supports components in the capacitive touch panel, the cover receives the touch of an object and protects other components, and the capacitive touch module is used to detect the capacitance change from the touch operation and then transforms the capacitance change into a sensing signal. As for consumer electronic devices, a light and thin electronic device is the common goal pursued by the users as well as the manufacturers. Many technical means including reduction in number of components and modification in size of components have been developed to improve the capacitive touch panel. Nevertheless, how to achieve the miniaturization is still an important issue in the field of the touch panel.

SUMMARY OF THE INVENTION

An objective of the present invention is to provide a thin touch module and a thin touch panel by reducing the dielectric element in thickness, thereby accomplishing the miniaturization of touch panel.

To achieve the foregoing objective, the present invention provides a touch module, comprising a first conductive element; a second conductive element; and a dielectric element disposed between the first conductive element and the second conductive element, the first conductive element electrically insulated from the second conductive element, and the dielectric element having a thickness equal to or less than 1 micrometer (μm).

Preferably, the dielectric element has a dielectric constant ranging from 5 to 80.

Preferably, the dielectric element has a thickness ranging from equal to or more than 0.05 micrometers to equal to or less than 1 micrometer, and more preferably, ranging from equal to or more than 0.05 micrometers to equal to or less than 0.5 micrometer.

Preferably, the dielectric element includes a material selected from the group consisting of: silicon nitride ($Si_3N_4$), aluminum oxide ($Al_2O_3$), hafnium silicate ($HfSiO_4$), yttrium oxide ($Y_2O_3$), tantalum oxide ($Ta_2O_3$), zirconium dioxide ($ZrO_2$), hafnium dioxide ($HfO_2$), lanthanum aluminum oxide (LaAlO3), titanium dioxide ($TiO_2$) and any combination thereof. Said dielectric element has a dielectric constant ranging from 5 to 80.

Preferably, the dielectric element includes a material selected from the group consisting of: silicon dioxide ($SiO_2$), silicon nitride ($Si_3N_4$), aluminum oxide ($Al_2O_3$), hafnium silicate ($HfSiO_4$), yttrium oxide ($Y_2O_3$), tantalum oxide ($Ta_2O_3$), zirconium dioxide ($ZrO_2$), hafnium dioxide (HfO2), lanthanum aluminum oxide (LaAlO3), titanium dioxide ($TiO_2$) and any combination thereof. Said dielectric element has a dielectric constant ranging from 5 to 80.

The present invention also provides a touch panel, comprising a substrate and a touch module disposed on the substrate. The touch module comprises: a first conductive element disposed on the substrate; a second conductive element; and a dielectric element disposed between the first conductive element and the second conductive element, the first conductive element electrically insulated from the second conductive element, and the dielectric element having a thickness equal to or less than 1 micrometer.

Preferably, the first conductive element comprises multiple first axial electrodes extending along a first direction and being electrically insulated from each other, and the second conductive element comprises multiple second axial electrodes extending along a second direction and being electrically insulated from each other, wherein the first direction intersects the second direction. Said dielectric element covers the first conductive element. Alternatively, the dielectric element comprises multiple dielectric blocks, which are disposed at positions where the first axial electrodes are overlapped with the second axial electrodes.

Preferably, the first conductive element comprises multiple first axial electrodes electrically insulated from each other and multiple conductive segments electrically insulated from each other, and the second conductive element comprises multiple electrical wires. The electrical wires of the second conductive elements each electrically connect two adjacent conductive segments to form multiple second axial electrodes. Preferably, the dielectric element comprises multiple dielectric blocks disposed between the electrical wires of the second conductive element and the first axial electrodes of the first conductive element, and the first axial electrodes are electrically insulated from the second axial electrodes.

Alternatively, the first conductive element comprises multiple electrical wires, and the second conductive element comprises multiple second axial electrodes electrically insulated from each other and multiple conductive segments electrically insulated from each other. The electrical wires of the first conductive elements each electrically connect two adjacent conductive segments to form multiple first axial electrodes. Preferably, the dielectric element comprises multiple dielectric blocks disposed between the electrical wires of the first conductive element and the second axial electrodes of the second conductive element, and the first axial electrodes are electrically insulated from the second axial electrodes.

Preferably, the dielectric element covers the first conductive element, and the dielectric element comprises multiple holes formed at the electrical wires of the first conductive element connected to the conductive segments.

In other embodiment of the present invention, the first conductive element may be consisted of multiple first axial electrodes, the second conductive element may be consisted of multiple second axial electrodes, and the dielectric element may be consisted of multiple dielectric blocks.

Preferably, the substrate includes glass or polymer.

Preferably, the dielectric element of the touch panel has a dielectric constant ranging from 5 to 80.

Preferably, the thickness of the dielectric element of the touch panel ranges from equal to or more than 0.05 micrometers to equal to or less than 1 micrometer. Or, the thickness of the dielectric element ranges from equal to or more than 0.05 micrometers to equal to or less than 0.5 micrometers.

Preferably, the dielectric element of the touch panel includes a material selected from the group consisting of: silicon nitride, aluminum oxide, hafnium silicate, yttrium oxide, tantalum oxide, zirconium dioxide, hafnium dioxide, lanthanum aluminum oxide, titanium dioxide and any combination thereof.

Preferably, the dielectric element of the touch panel includes a material selected from the group consisting of: silicon dioxide, silicon nitride, aluminum oxide, hafnium silicate, yttrium oxide, tantalum oxide, zirconium dioxide, hafnium dioxide, lanthanum aluminum oxide, titanium dioxide and any combination thereof.

With the achievement of thin design, the touch panel having a reduced interval between the first and second conductive elements offers an improved touch sensitivity. By using a material having high dielectric constant as the dielectric material, the touch panel also offers a better antistatic performance. Furthermore, since the thickness of the dielectric element is reduced, usage of insulated dielectric material during the production of touch panel is reduced, and thereby the present invention is also beneficial to lower the production cost.

Other objectives, advantages and novel features of the invention will become more apparent from the following detailed description when taken in conjunction with the accompanying drawings.

DETAILED DESCRIPTION OF THE PREFERRED EMBODIMENTS

Hereinafter, one skilled in the arts can easily realize the advantages and effects of a touch module and a touch panel comprising the same in accordance with the present invention from the following embodiments. The descriptions proposed herein are just preferable embodiments for the purpose of illustrations only, not intended to limit the scope of the invention. Various modifications and variations could be made in order to practice or apply the present invention without departing from the spirit and scope of the invention.

Figure 1:
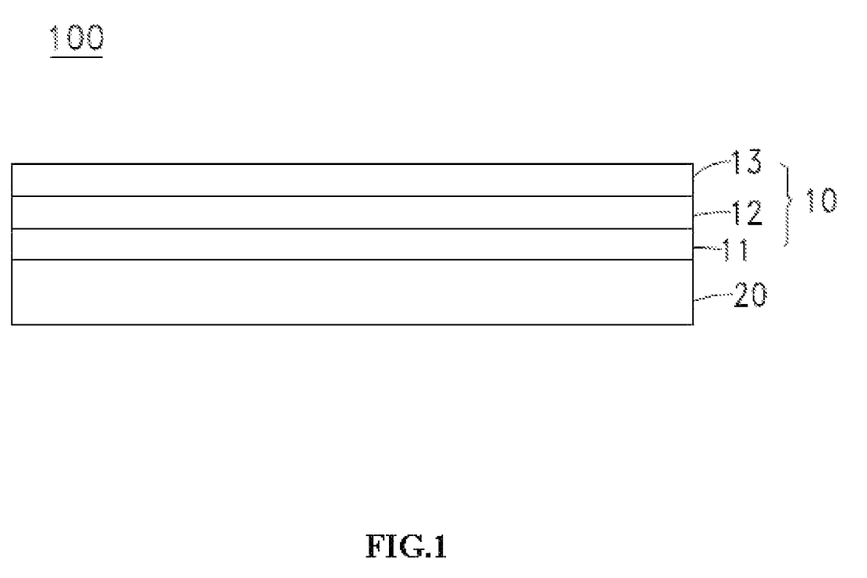
FIG. 1 is a cross-sectional schematic view of a first embodiment of a touch panel in accordance with the present invention.

The cross-sectional schematic view of a first embodiment of a touch panel in accordance with the present invention as shown in FIG. 1 illustrates that the touch panel 100 comprises a substrate 20 and a touch module 10 disposed on the substrate 20.

The substrate 20 may be, but is not limited to, a rigid substrate or a flexible substrate, and the substrate 20 may be made of a variety of transparent or opaque materials, such as glass, polycarbonate (PC), polyethylene terephthalate (PET), polymethylmethacrylate (PMMA), polysulfone (PES), or other cyclic olefin copolymer. The touch module 10 comprises a first conductive element 11, a dielectric element 12, and a second conductive element 13. Said first conductive element 11 is disposed on the substrate 20, and the second conductive element 13 is disposed above the first conductive element 11. The dielectric element 12 is disposed between the first conductive element 11 and the second conductive element 13, whereby the first conductive element 11 is electrically insulated from the second conductive element 13.

Figure 2:
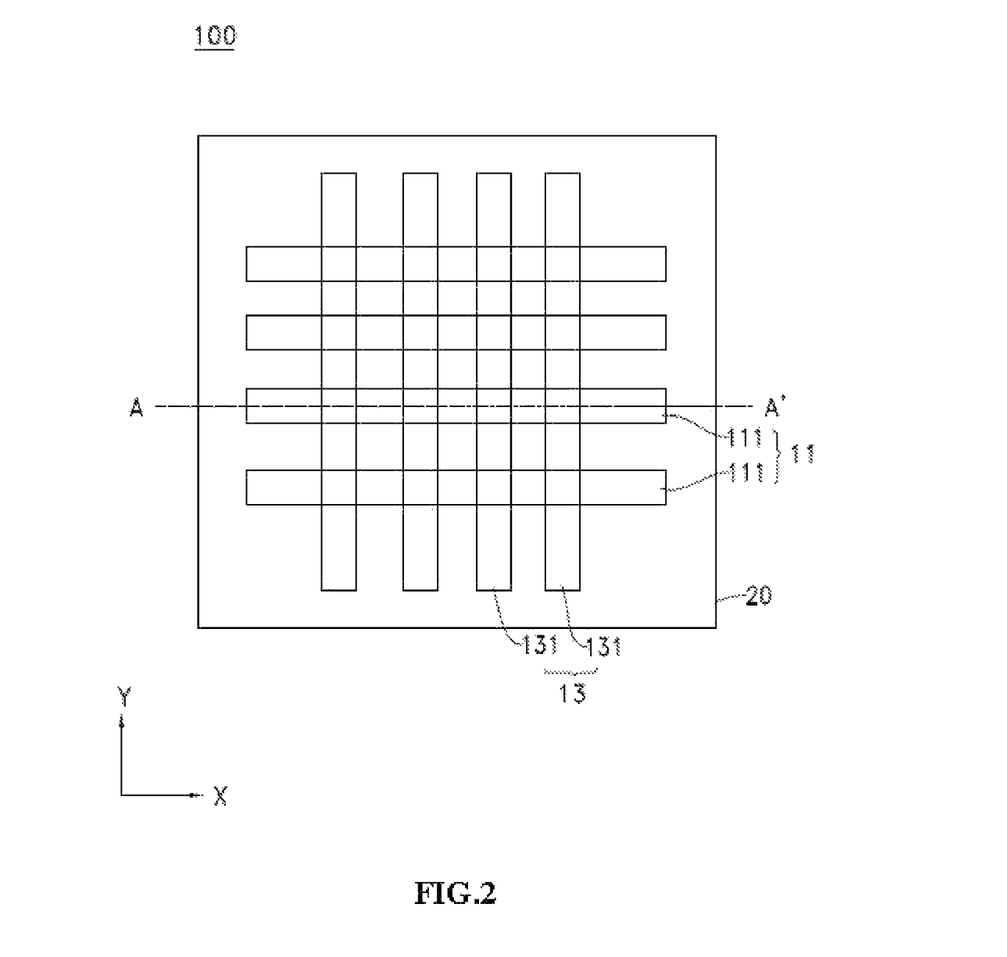
FIG. 2 is a schematic view of the first embodiment of a touch panel in accordance with the present invention.
Figure 3:
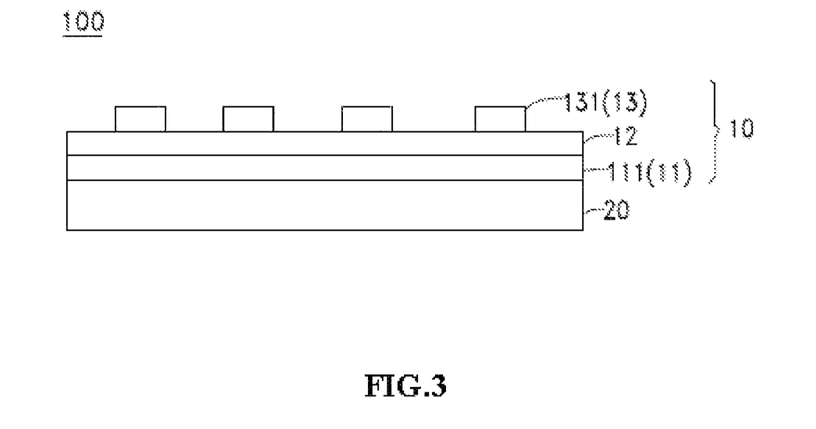
FIG. 3 is a cross-sectional view taken across line A-A' of FIG. 2.

The schematic view of the first embodiment of a touch panel in accordance with the present invention as shown in FIG. 2 and the cross-sectional view taken across A-A' of FIG. 2 as shown in FIG. 3 illustrate that the first conductive element 11 comprises multiple long strip-shaped first axial electrodes 111 extending along a first direction X, and each first axial electrode 111 is electrically insulated from one another. The second conductive element 13 comprises multiple long strip-shaped second axial electrodes 131 extending along a second direction Y, the second direction Y intersects the first direction X, and each second axial electrode 131 is electrically insulated from one another. The first axial electrodes 111 and second axial electrodes 131 are electrically connected to a controller (not shown). In the instant embodiment, each first axial electrode 111 is considered as a transverse electrode, each second axial electrode 131 is considered as a longitudinal electrode, and the first direction X is preferably, but not limited to, vertical to the second direction Y. In the instant embodiment, the long strip-shaped first axial electrodes 111 and second axial electrodes 131 are each formed in a rectangular shape, and may in practice be modified into various shapes. For example, the long strip-shaped first axial electrodes 111 and the long strip-shaped second axial electrodes 131 may be formed by multiple electrode units in different shapes, such as triangles, rhombi, squares and regular hexagons.

The first conductive element 11 and the second conductive element 13 may be made of a solid conductive material or a liquid conductive material. For example, the solid conductive material may be a transparent conductive material such as indium tin oxide (ITO), indium zinc oxide (IZO) and $Al_2O_3$ doped zinc oxide (AZO) or an opaque conductive material such as metals. For example, the liquid conductive material may be conductive nano atoms such as silver nanoparticles; a transparent conductive material such as carbon nanotubes and poly(3,4-ethylenedioxythiophene):poly (styrene sulfonate) (PEDOT:PSS); or an opaque conductive material such as metals. For example, said metals may be gold, silver or copper.

The dielectric element 12 is disposed on the first conductive element 11 and covers the first conductive element 11. The dielectric element 12 has a thickness equal to or less than 1 micrometer.

Each of the first axial electrodes 111 is arranged to intersect the second axial electrodes 131 and partially overlap the second axial electrodes 131, and thereby the first axial electrodes 111 and the second axial electrodes 131 are arranged to form a capacitor array in the panel, and the first axial electrodes 111 and the second axial electrodes 131 are electrically insulated from each other by the dielectric element 12. When a user touches on the touch panel by a touch tool such as a finger or conductive object, the touch tool generates capacitive coupling with the first conductive element 11 and the second conductive element 13 respectively. Detection of the potential change in each area of the capacitor array is conducted to achieve touch and sense. As the thickness of the dielectric element 12 is thinner, the interval between the first conductive element 11 and the second conductive element 13 is smaller, and thereby the touch panel offers a higher sensitivity. The dielectric constant of the dielectric element 12 ranges from 5 to 80. As the dielectric constant of the dielectric element 12 is higher, the impedance of the dielectric element 12 is higher, and thereby the touch panel 100 offers a better antistatic capability. When the thickness of the dielectric element 12 is equal to or more than 0.05 micrometers, modifications of equipments and techniques are not much required during the production of the dielectric element 12, thereby offering a higher yield rate and a more economic production.

The dielectric element 12 may include silicon dioxide ($SiO_2$), silicon nitride ($Si_3N_4$), aluminum oxide ($Al_2O_3$), hafnium silicate ($HfSiO_4$), yttrium oxide ($Y_2O_3$), tantalum oxide ($Ta_2O_3$), zirconium dioxide ($ZrO_2$), hafnium dioxide ($HfO_2$), lanthanum aluminum oxide ($LaAlO3$), titanium dioxide ($TiO2$) or any combination thereof, such as tantalum oxide, tantalum oxide-hafnium silicate ($Ta2O3-HfSiO4$), tantalum oxide-silicon dioxide ($Ta2O3-SiO2$) and silicon dioxide-tantalum oxide-hafnium silicate ($SiO2-Ta2O3-HfSiO4$).

In practice, the touch panel 100 may be integrated with a display screen in a combination mode or a separation mode. If the touch panel 100 and the display screen work in combination, that is, the touch panel 100 is disposed on the display screen to allow the operation of the display screen, the substrate 20 is a transparent substrate and the first conductive element 11 and the second conductive element 13 are made of transparent conductive materials. When the dielectric element 12 has a thinner thickness, the transparency of the dielectric element 12 is higher, and thereby the transparency of the touch panel 100 is also higher. On the other hand, if the touch panel 100 and the display screen work separately, the substrate 20 may be an opaque substrate and the first conductive element 11 and the second conductive element 13 may be made of transparent conductive materials or opaque conductive materials.

Various embodiments of the touch panels in accordance with the present invention are described hereinafter. To give a simplified description, only differences between these embodiments are described in detail. Same elements or components in the embodiments are marked with the same reference numbers for cross reference.

Figure 4:
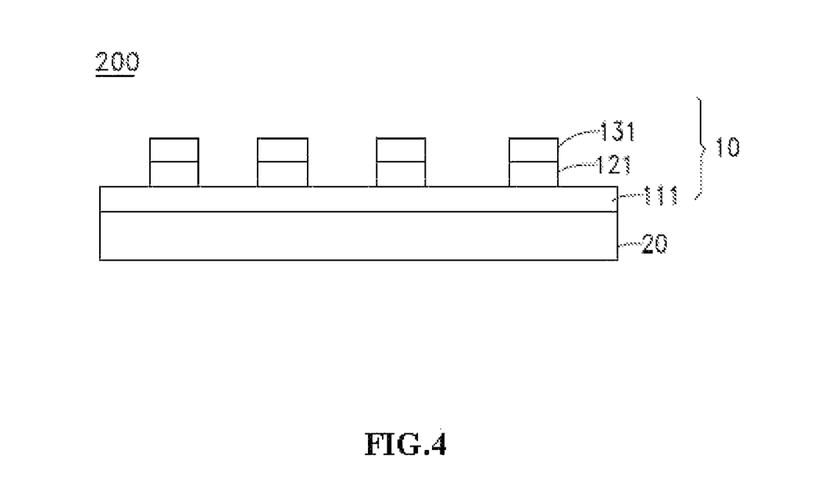
FIG. 4 is a cross-sectional view of a second embodiment of a touch panel in accordance with the present invention.

The cross-sectional view of a second embodiment of a touch panel in accordance with the present invention as shown in FIG. 4 illustrates that the touch panel 200 comprises a substrate 20 and a touch module 10 disposed on the substrate 20.

The touch module 10 comprises a first conductive element 11, a dielectric element 12, and a second conductive element 13. The first conductive element 11 comprises multiple long strip-shaped first axial electrodes 111 extending along a first direction and each first axial electrode 111 is electrically insulated from one another. The second conductive element 13 comprises multiple long strip-shaped second axial electrodes 131 extending along a second direction and each second axial electrode 131 is electrically insulated from one another. The difference between the touch panel 200 of the instant embodiment and the touch panel 100 of the first embodiment is that the dielectric element 12 of the second embodiment is consisted of multiple dielectric blocks 121, which are disposed between the first axial electrodes 111 and the second axial electrodes 131 and disposed at positions where the first axial electrodes 111 are overlapped with the second axial electrodes 131, whereby the first axial electrodes 111 are electrically insulated from the second axial electrodes 131. In practice, the touch panel 200 may be integrated with a display screen in a combination mode or a separation mode. If the touch panel 200 and the display screen work in combination, that is, the touch panel 200 is disposed on the display screen to allow the operation of the display screen, the substrate 20 is a transparent substrate and the first conductive element 11 and the second conductive element 13 are made of transparent conductive materials. When the dielectric blocks 121 have a thinner thickness, the transparency of the dielectric blocks 121 is higher, and thereby the transparency of the touch panel 200 is also higher and the color difference thereof is lower. On the other hand, if the touch panel 200 and the display screen work separately, the substrate 20 may be an opaque substrate and the first conductive element 11 and the second conductive element 13 may be made of transparent conductive materials or opaque conductive materials.

Figure 5:
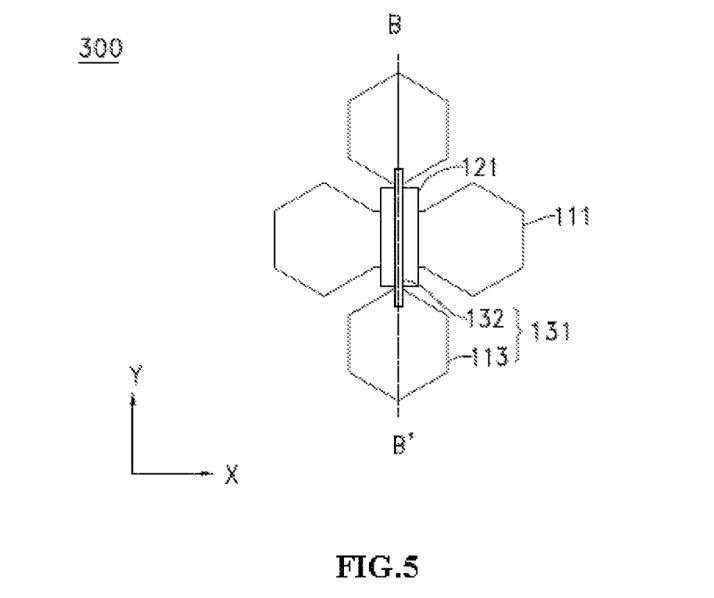
FIG. 5 is a schematic view of a third embodiment of a touch panel in accordance with the present invention.
Figure 6:
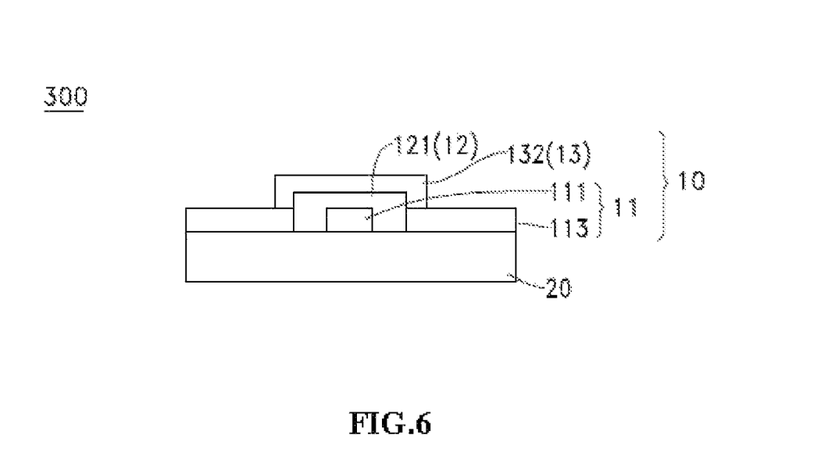
FIG. 6 is a cross-sectional view taken across line B-B' of FIG. 5.

The schematic view of a third embodiment of a touch panel in accordance with the present invention as shown in FIG. 5 and the cross-sectional view taken across B-B' of FIG. 5 as shown in FIG. 6 illustrate that the touch panel 300 comprises a substrate 20 and a touch module 10 disposed on the substrate 20. The touch module 10 comprises a first conductive element 11, a dielectric element 12, and a second conductive element 13. The difference between the touch panel 300 of the instant embodiment and the touch panel 100 of the first embodiment is that the first conductive element 11 of the third embodiment comprises multiple long strip-shaped first axial electrodes 111 extending along a first direction X and multiple conductive segments 113. Each first axial electrode 111 is electrically insulated from one another, each conductive segment 113 is electrically insulated from one another, and the first axial electrodes 111 are electrically insulated from the conductive segments 113. The second conductive element 13 comprises multiple electrical wires 132, the electrical wires 132 each electrically connecting two adjacent conductive segments 113 to form multiple second axial electrodes 131. The dielectric element 12 is consisted of multiple dielectric blocks 121, which are disposed between the electrical wires 132 and the first axial electrodes 111, whereby the first axial electrodes 111 are electrically insulated from the second axial electrodes 131. In the instant embodiment, the dielectric blocks 121 each have a thickness equal to or less than 1 micrometer and a dielectric constant ranging from 5 to 80. The dielectric element 12 may include silicon dioxide, silicon nitride, aluminum oxide, hafnium silicate, yttrium oxide, tantalum oxide, zirconium dioxide, hafnium dioxide, lanthanum aluminum oxide, titanium dioxide or any combination thereof, such as tantalum oxide, tantalum oxide-hafnium silicate, tantalum oxide-silicon dioxide and silicon dioxide-tantalum oxide-hafnium silicate. When the dielectric constant of the dielectric element 12 is higher, the impedance of the dielectric element 12 is higher, and thereby the touch panel 300 offers a better antistatic capability.

In practice, the touch panel 300 may be integrated with a display screen in a combination mode or a separation mode. If the touch panel 300 and the display screen work in combination, that is, the touch panel 300 is disposed on the display screen to allow the operation of the display screen, the substrate 20 is a transparent substrate and the first conductive element 11 is made of transparent conductive materials. When the dielectric blocks 121 have a thinner thickness, the transparency of the dielectric blocks 121 is higher, and thereby the transparency of the touch panel 300 is also higher and the color difference thereof is lower. On the other hand, if the touch panel 300 and the display screen work separately, the substrate 20 may be an opaque substrate and the first conductive element 11 may be made of transparent conductive materials or opaque conductive materials.

Figure 7:
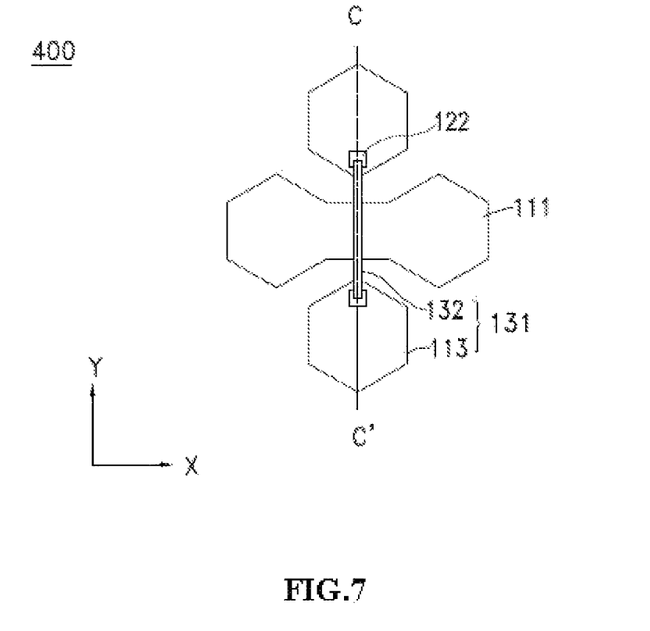
FIG. 7 is a schematic view of a fourth embodiment of a touch panel in accordance with the present invention.
Figure 8:
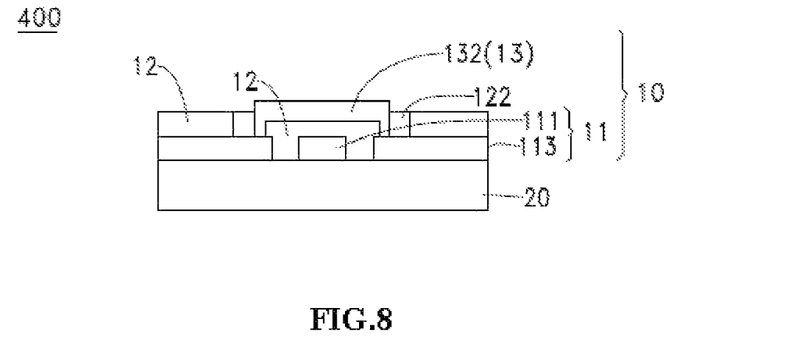
FIG. 8 is a cross-sectional view taken across line C-C' of FIG. 7.

The schematic view of a fourth embodiment of a touch panel in accordance with the present invention as shown in FIG. 7 and the cross-sectional view taken across C-C' of FIG. 7 as shown in FIG. 8 illustrate that the touch panel 400 comprises a touch module 10 and a substrate 20. The touch module 10 comprises a first conductive element 11, a dielectric element 12, and a second conductive element 13. The difference between the touch panel 400 of the instant embodiment and the touch panel 100 of the first embodiment is that the first conductive element 11 of the fourth embodiment comprises multiple long strip-shaped first axial electrodes 111 extending along a first direction X and multiple conductive segments 113. Each first axial electrode 111 is electrically insulated from one another, each conductive segment 113 is electrically insulated from one another, and the first axial electrodes 111 are electrically insulated from the conductive segments 113. The second conductive element 13 comprises multiple electrical wires 132

The dielectric element 12 covers the first axial electrodes 111 of the first conductive element 11, the conductive segments 113, and the substrate 20, and the dielectric element 12 comprises multiple holes 122 formed at the electrical wires 132 of the second conductive element 13 connected to the conductive segments 113, whereby the electrical wires 132 each electrically connect two adjacent conductive segments 113 to form multiple second axial electrodes 131 and the first axial electrodes 111 are electrically insulated from the second axial electrodes 131. In the instant embodiment, the dielectric element 12 has a thickness equal to or less than 1 micrometer and a dielectric constant ranging from 5 to 80. The dielectric element 12 may include silicon nitride, aluminum oxide, hafnium silicate, yttrium oxide, tantalum oxide, zirconium dioxide, hafnium dioxide, lanthanum aluminum oxide, titanium dioxide or any combination thereof, such as tantalum oxide, tantalum oxide-hafnium silicate, tantalum oxide-silicon dioxide and silicon dioxide-tantalum oxide-hafnium silicate. When the dielectric constant of the dielectric element 12 is higher, the impedance of the dielectric element 12 is higher, and thereby the touch panel 400 offers a better antistatic capability. In practice, the touch panel 400 may be integrated with a display screen in a combination mode or a separation mode. If the touch panel 400 and the display screen work in combination, that is, the touch panel 400 is disposed on the display screen to allow the operation of the display screen, the substrate 20 is a transparent substrate and the first conductive element 11 is made of transparent conductive material. When the dielectric element 12 has a thinner thickness, the transparency of the dielectric element 12 is higher, thereby the transparency of the touch panel 400 is also higher. On the other hand, if the touch panel 400 and the display screen work separately, the substrate 20 may be an opaque substrate and the first conductive element 11 may be made of transparent conductive materials or opaque conductive materials.

Figure 9:
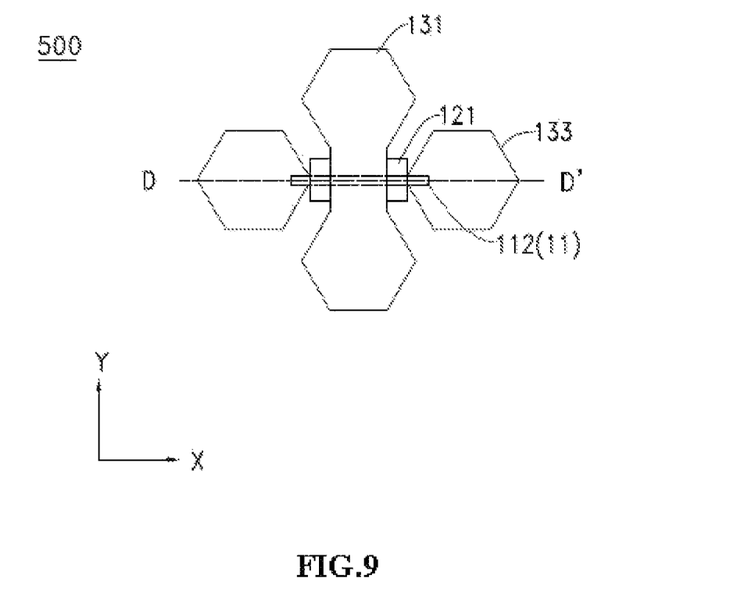
FIG. 9 is a schematic view of a fifth embodiment of a touch panel in accordance with the present invention.
Figure 10:
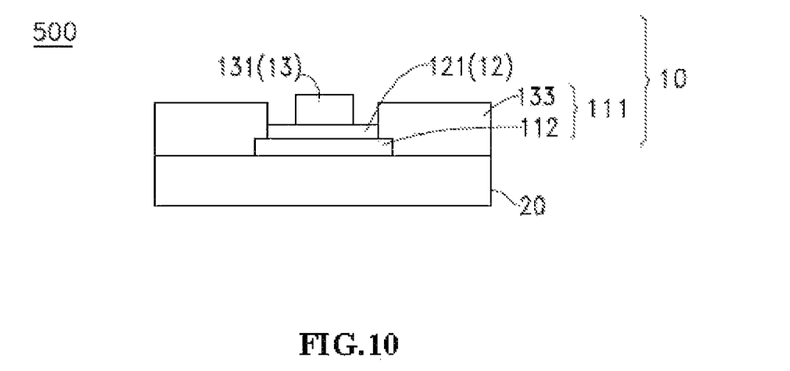
FIG. 10 is a cross-sectional view taken across line D-D' of FIG. 9.

The schematic view of a fifth embodiment of a touch panel in accordance with the present invention as shown in FIG. 9 and the cross-sectional view taken across D-D' of FIG. 9 as shown in FIG. 10 illustrate that the touch panel 500 comprises a substrate 20 and a touch module 10 disposed on the substrate 20. The touch module 10 comprises a first conductive element 11, a dielectric element 12, and a second conductive element 13. The difference between the touch panel 500 of the instant embodiment and the touch panel 100 of the first embodiment is that the first conductive element 11 of the fifth embodiment comprises multiple electrical wires 112, and the second conductive element 13 comprises multiple long strip-shaped second axial electrodes 131 extending along a second direction Y and multiple conductive segments 133. Each second axial electrode 131 is electrically insulated from one another, each conductive segment 113 is electrically insulated from one another, and the second axial electrodes 131 are electrically insulated from the conductive segments 133. The electrical wires 112 of the first conductive element 11 each electrically connect two adjacent conductive segments 133 to form multiple first axial electrodes 111.

The dielectric element 12 is consisted of multiple dielectric blocks 121. The dielectric blocks 121 are disposed between the electrical wires 112 and the second axial electrodes 131 and fully cover the electrical wires 112, such that the electrical wires 112 are electrically insulated from the second axial electrodes 131. In the instant embodiment, the dielectric blocks 121 each have a thickness equal to or less than 1 micrometer and a dielectric constant ranging from 5 to 80. The dielectric element 12 may include silicon dioxide, silicon nitride, aluminum oxide, hafnium silicate, yttrium oxide, tantalum oxide, zirconium dioxide, hafnium dioxide, lanthanum aluminum oxide, titanium dioxide or any combination thereof, such as tantalum oxide, tantalum oxide-hafnium silicate, tantalum oxide-silicon dioxide and silicon dioxide-tantalum oxide-hafnium silicate. When the dielectric constant of the dielectric element 12 is higher, the impedance of the dielectric element 12 is higher, and thereby the touch panel 500 offers a better antistatic capability. In practice, the touch panel 500 may be integrated with a display screen in a combination mode or a separation mode. If the touch panel 500 and the display screen work in combination, that is, the touch panel 500 is disposed on the display screen to allow the operation of the display screen, the substrate 20 is a transparent substrate and the second conductive element 13 is made of a transparent conductive material. When the dielectric blocks 121 have a thinner thickness, the transparency of the dielectric blocks 121 is higher, and thereby the transparency of the touch panel 500 is also higher and the color difference thereof is lower. On the other hand, if the touch panel 500 and the display screen work separately, the substrate 20 may be an opaque substrate and the second conductive element 13 may be made of a transparent conductive material or an opaque conductive material.

Figure 11:
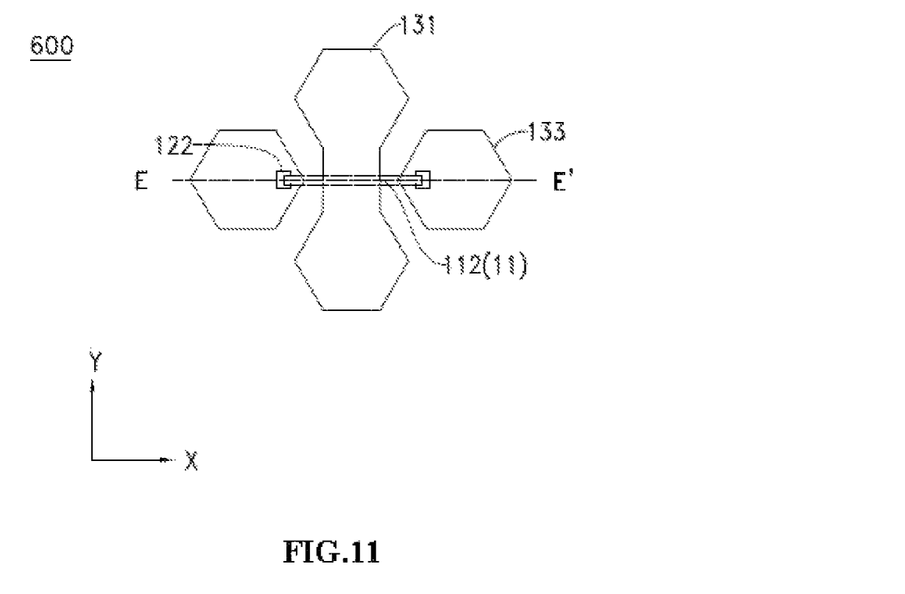
FIG. 11 is a schematic view of a sixth embodiment of a touch panel in accordance with the present invention.
Figure 12:
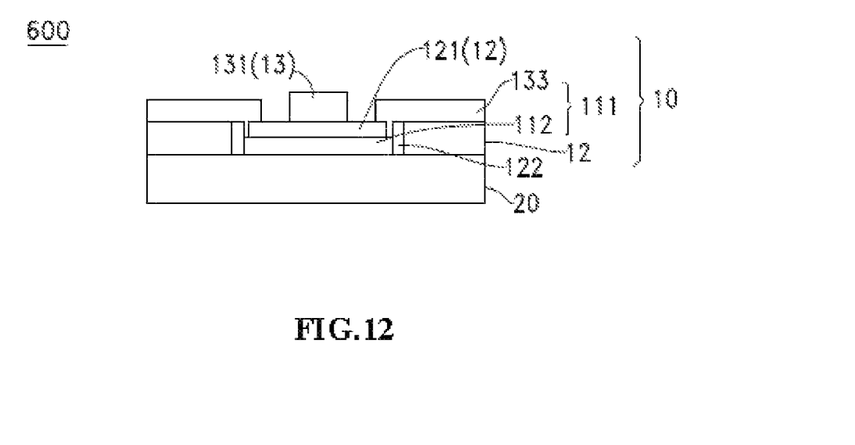
FIG. 12 is a cross-sectional view taken across line E-E' of FIG. 11.

The schematic view of a sixth embodiment of a touch panel in accordance with the present invention as shown in FIG. 11 and the cross-sectional view taken across E-E' of FIG. 11 as shown in FIG. 12 illustrate that the touch panel 600 comprises a touch module 10 and a substrate 20. The touch module 10 comprises a first conductive element 11, a dielectric element 12, and a second conductive element 13. The difference between the touch panel 600 of the instant embodiment and the touch panel 100 of the first embodiment is that the first conductive element 11 of the sixth embodiment comprises multiple electrical wires 112, and the second conductive element 13 comprises multiple long strip-shaped second axial electrodes 131 extending along a second direction Y and multiple conductive segments 133. Each second axial electrode 131 is electrically insulated from one another, each conductive segment 133 is electrically insulated from one another, and the second axial electrodes 131 are electrically insulated from the conductive segments 133.

The dielectric element 12 covers the electrical wires 112 and the substrate 20, and the dielectric element 12 comprises multiple holes 122 formed at the electrical wires 112 of the second conductive element 13 connected to the conductive segments 133 of the first conductive element 11, whereby the electrical wires 112 each electrically connect two adjacent conductive segments 133 to form multiple first axial electrodes 111, and the first axial electrodes 111 are electrically insulated from the second axial electrodes 131. In the instant embodiment, the dielectric element 12 has a thickness equal to or less than 1 micrometer and a dielectric constant ranging from 5 to 80. The dielectric element 12 may include silicon dioxide, silicon nitride, aluminum oxide, hafnium silicate, yttrium oxide, tantalum oxide, zirconium dioxide, hafnium dioxide, lanthanum aluminum oxide, titanium dioxide or any combination thereof, such as tantalum oxide, tantalum oxide-hafnium silicate, tantalum oxide-silicon dioxide and silicon dioxide-tantalum oxide-hafnium silicate. When the dielectric constant of the dielectric element 12 is higher, the impedance of the dielectric element 12 is higher, and thereby the touch panel 600 offers a better antistatic capability. In practice, the touch panel 600 may be integrated with a display screen in a combination mode or a separation mode. If the touch panel 600 and the display screen work in combination, that is, the touch panel 600 is disposed on the display screen to allow the operation of the display screen, the substrate 20 is a transparent substrate and the first conductive element 11 is made of a transparent conductive material. When the dielectric element 12 has a thinner thickness, the transparency of the dielectric element 12 is higher, and thereby the transparency of the touch panel 600 is also higher. On the other hand, if the touch panel 600 and the display screen work separately, the substrate 20 may be an opaque substrate and the first conductive element 11 may be made of a transparent conductive material or an opaque conductive material.

In accordance with the present invention, the touch panel, such as the touch panels 100, 200, 300, 400, 500, 600 as stated above, comprises a dielectric element 12 having a thickness equal to or less than 1 micrometer. When the dielectric element 12 is thinner, the interval between the first conductive element 11 and the second conductive element 13 is smaller, and thereby the sensitivity and antistatic capability of the touch panel are better.

An air-type electrostatic discharge test is conducted on several touch panels comprising a 1 μm-thick dielectric element 12 and having different dielectric constants. As shown in Table 1, all touch panels provide an antistatic voltage more than 100V. The results demonstrate that when the thickness of the dielectric element is constant, the antistatic performance of the touch panel is directly proportional to the dielectric constant (k).

TABLE 1

| | Sample No. | | | | | | | | |
|---|---|---|---|---|---|---|---|---|---|
| | 1 | 2 | 3 | 4 | 5 | 6 | 7 | 8 | 9 |
| dielectric constant (k) | 7 | 9 | 11 | 15 | 22 | 25 | 25 | 30 | 80 |
| material of the dielectric element | $Si_3N_4$ | $Al_2O_3$ | $HfSiO_4$ | $Y_2O_3$ | $Ta_2O_3$ | $ZrO_2$ | $HfO_2$ | LaAlO3 | $TiO_2$ |
| thickness of the dielectric element (μm) | 1 | 1 | 1 | 1 | 1 | 1 | 1 | 1 | 1 |
| maximum antistatic voltage (V) | 107 | 138 | 169 | 230 | 338 | 384 | 384 | 461 | 1230 |

A further air-type electrostatic discharge test is conducted on a touch panel comprising a 1 μm-thick dielectric element 12 and having different dielectric constants with a simulated maximum antistatic voltage of 120 V. As shown in Table 2, the dielectric constant (k) of the dielectric element is inversely proportional to the thickness thereof when the touch panels have equal antistatic performance.

TABLE 2

| | Sample No. | | | | | | | | |
|---|---|---|---|---|---|---|---|---|---|
| | 1 | 2 | 3 | 4 | 5 | 6 | 7 | 8 | 9 |
| dielectric constant (k) | 7 | 9 | 11 | 15 | 22 | 25 | 25 | 30 | 80 |

TABLE 2-continued

| | Sample No. | | | | | | | | |
|---|---|---|---|---|---|---|---|---|---|
| | 1 | 2 | 3 | 4 | 5 | 6 | 7 | 8 | 9 |
| material of the dielectric element | $Si_3N_4$ | $Al_2O_3$ | $HfSiO_4$ | $Y_2O_3$ | $Ta_2O_3$ | $ZrO_2$ | $HfO_2$ | $LaAlO3$ | $TiO_2$ |
| thickness of the dielectric element (μm) | 1.1 | 0.87 | 0.7 | 0.5 | 0.35 | 0.3 | 0.3 | 0.26 | 0.09 |
| maximum antistatic voltage (V) | 120 | 120 | 120 | 120 | 120 | 120 | 120 | 120 | 120 |

The dielectric constant and material of the dielectric element listed in Tables 1 and 2 are illustrative only, the scope of the present invention should not be limited thereto.

In conclusion, the touch panel in accordance with the present invention not only achieves the goal of thin design, but also offers an improved touch sensitivity because of the reduced interval between the first and second conductive elements. Moreover, the touch panel further provides a better antistatic performance by using a high dielectric constant material as the dielectric material. Due to the reduced thickness of the dielectric element, the usage of insulated dielectric material and the production cost are reduced. Moreover, if the touch panel is disposed on the display screen to allow the operation of the display screen, the touch panel can also provide a higher transparency and lower color difference.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touch module, comprising:
a first conductive element;
a second conductive element; and
a dielectric element disposed between the first conductive element and the second conductive element, wherein:
the first conductive element is electrically insulated from the second conductive element,
the dielectric element has a thickness equal to or less than 1 micrometer,
the first conductive element comprises multiple electrical wires,
the second conductive element comprises multiple second axial electrodes electrically insulated from each other and multiple conductive segments electrically insulated from each other,
the dielectric element fully covers the first conductive element,
the dielectric element comprises multiple holes formed where the electrical wires of the first conductive element connect to the conductive segments of the second conductive element,
the electrical wires of the first conductive element each electrically connect two adjacent conductive segments of the second conductive element to form multiple first axial electrodes,
the dielectric element comprises a material selected from the group consisting of: hafnium silicate, tantalum oxide, zirconium dioxide, lanthanum aluminum oxide, titanium dioxide and any combination thereof, and
the dielectric element has a dielectric constant ranging from 30 to 80.

2. The touch module as claimed in claim 1, wherein the thickness of the dielectric element is at least 0.05 micrometers.

3. The touch module as claimed in claim 1, wherein the thickness of the dielectric element ranges from equal to or more than 0.05 micrometers to equal to or less than 0.5 micrometers.

* * * * *